(12) United States Patent
Chirayil

(10) Patent No.: US 9,408,183 B2
(45) Date of Patent: Aug. 2, 2016

(54) PAGING RECEPTION IN WIRELESS COMMUNICATION DEVICES WITH DUAL SIM

(75) Inventor: Beena Joy Chirayil, Kerala (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/233,412

(22) PCT Filed: Jul. 12, 2012

(86) PCT No.: PCT/EP2012/063721
§ 371 (c)(1),
(2), (4) Date: Jan. 17, 2014

(87) PCT Pub. No.: WO2013/014000
PCT Pub. Date: Jan. 31, 2013

(65) Prior Publication Data
US 2014/0128082 A1 May 8, 2014

Related U.S. Application Data

(60) Provisional application No. 61/540,614, filed on Sep. 29, 2011.

(30) Foreign Application Priority Data

Jul. 25, 2011 (IN) .......................... 2098/DEL/2011

(51) Int. Cl.
*H04W 36/00* (2009.01)
*H04W 68/02* (2009.01)
*H04W 36/38* (2009.01)
*H04W 48/20* (2009.01)
*H04W 88/06* (2009.01)

(52) U.S. Cl.
CPC ............. *H04W 68/02* (2013.01); *H04W 36/38* (2013.01); *H04W 48/20* (2013.01); *H04W 88/06* (2013.01)

(58) Field of Classification Search
CPC ...................................... H04W 68/02
See application file for complete search history.

(56) References Cited

U.S. PATENT DOCUMENTS

2003/0125073 A1    7/2003  Tsai et al.
2009/0215472 A1*   8/2009  Hsu .............................. 455/458
(Continued)

FOREIGN PATENT DOCUMENTS

CN          101217737 A    7/2008
CN          101217747 A    7/2008
(Continued)

*Primary Examiner* — Tammy Pham
*Assistant Examiner* — Idowu O Osifade
(74) *Attorney, Agent, or Firm* — Coats & Bennett, PLLC

(57) ABSTRACT

Methods and devices for resolving paging collisions in a communication device (105-1) are described. The method includes detecting a probable paging collision between two subscriber identity modules (SIMs) (115) of the communication device (105-1) and determining whether at least one SIM of the communication device (105-1) has a non-serving cell in a corresponding broadcast control channel (BCCH) allocation list (BA-list). Further, the method includes ascertaining, based on one or more selection parameters, whether the at least one SIM can be selected for forced cell reselection and indicating, based on the ascertaining, exclusion of a currently serving cell of a SIM selected for the forced cell reselection from normal cell reselection procedure. Further, the forced cell reselection is initiated for the selected SIM. Further in some embodiments, if none of the SIMs can be selected for a forced cell reselection, then a Paging Message Position (PMP) recomputation Request is sent to a network controller to change the paging block position computation from IMSI-based computation to TMSI-based computation.

13 Claims, 5 Drawing Sheets

(56) References Cited

U.S. PATENT DOCUMENTS

2009/0312020 A1 12/2009 Lee
2010/0279698 A1 11/2010 Wong

FOREIGN PATENT DOCUMENTS

EP 2466970 A1 6/2012
WO 2011056252 A1 5/2011

* cited by examiner

PAGING RECEPTION IN WIRELESS COMMUNICATION DEVICES WITH DUAL SIM

TECHNICAL FIELD

The present subject matter relates, in general, to wireless communication devices and, in particular, to paging reception in wireless communication devices.

BACKGROUND

Communication devices, such as cellular phones, personal digital assistants, and portable computers, provide users with a variety of mobile communication services and networking capabilities. Generally, the communication devices incorporate a Subscriber Identity Module (SIM), which holds information required to establish the identity of the person using the communication device and bill the costs of calls to the appropriate account holder, etc. With the recent development of communication technologies, the communication devices may be configured to include multiple SIMs. Thus, a user of the communication device may receive or make calls using any one of the multiple SIMs.

Paging is a mechanism in wireless communication, using which the network sends messages to a user equipment or a communication device for call establishment, packet channel assignment or notifications. Such messages are referred to as paging messages. Typically, in Circuit-Switched (CS) domain, for any mobile-terminating call, a paging message is sent by the network to the communication device of the called party to indicate the mobile-terminating call. Similarly, in Packet-switched (PS) domain, a packet downlink channel assignment message is sent by the network in the paging message for establishing a packet downlink connection. Since in mobile communication systems, the concept of Discontinuous Reception (DRX) is used to reduce power consumption of the communication device in an idle mode, base stations transmit the paging messages for users, only on certain blocks of the common control channel. These blocks are referred as 'paging occasions' of the communication device and are generally determined based on the communication device's International Mobile Subscriber Identity (IMSI) and certain parameters, provided by the network. For example, in GSM, the paging occasion or the position of paging block for any user equipment is determined from parameters BS_CC_CHANS & BS_PA_MFRMS provided by the network.

Typically, a communication device receives paging messages through a radio frequency (RF) device, such an antenna and radio front end circuits, of the communication device. In case the communication device includes only a single RF device, the communication device may be capable of reading only one frequency and one time slot at a time, i.e., the communication device will be able to receive only one SIM's paging message at any given time, in case the communication device includes multiple SIMs. Since in multi-SIM configuration, the paging occasions of the multiple SIMs can occur in the same time in the air interface, there may be some compromise in the reception of the paging blocks for either of the SIMs. Such an overlap of paging occasions of two or more SIMs in a multi-SIM communication device is termed as 'paging collision'. In such a case, one or more of the multiple SIMs may miss reading of few or all of the paging messages directed towards them so that the RF device can listen to the paging of one of the other SIMs. Consequently, a terminating call or packet channel assignment for any of the SIMs can be missed or not received by the communication device.

SUMMARY

This summary is provided to introduce concepts related to a method and a device to enable whole paging reception on all the SIMs when a probable paging collision is identified, in a multi-SIM wireless communication device. The concepts are further described below in the detailed description. This summary is not intended to identify essential features of the claimed subject matter nor is it intended for use in determining or limiting the scope of the claimed subject matter.

In a first aspect, the invention concerns a method to resolve paging collisions in a communication device to enable paging reception on multiple subscriber identity modules (SIMs) of the communication device. The method includes detecting a probable paging collision between at least two SIMs in the communication device. For example, the probable paging collision can—either be a complete overlap or a partial overlap. Upon detecting the probable paging collision, it is determined whether at least one SIM of the communication device has a non-serving cell in a corresponding broadcast control channel (BCCH) allocation list (BA-list) and based on one or more selection parameters, it is ascertained whether the at least one SIM can be selected for a forced cell reselection. Further, the method includes indicating exclusion of a currently serving cell of a SIM, selected for the forced cell reselection, from a corresponding normal cell reselection procedure. The method further includes initiating the forced cell reselection for the selected SIM. In some embodiments, the one or more selection parameters may comprise signal strength of the serving cell and/or of one or more neighboring cells. In some embodiments, the one or more selection parameters may comprise a priority among the SIMs (e.g. indicating that one of the SIMs should be a first candidate for forced cell reselection, another one of the SIMs should be a second candidate for forced cell reselection, etc.). In some embodiments, the one or more selection parameters may comprise any combination of cell signal strength and SIM priority.

In one embodiment, if it is determined that a switching criterion is satisfied, it is indicated to include the excluded cell for the normal cell reselection procedure for the SIM which had undergone the forced cell reselection. The switching criterion includes one of a reconfiguration of one or more paging parameters for either of the SIMs or an occurrence of normal reselection of a cell for either of the SIMs in the multi-SIM device.

Further, in one embodiment, a paging message position (PMP) recomputation SIM may be identified, when at least one forced cell reselection criterion is not satisfied. The selection criterion includes, for example, availability of at least one non-serving cell in a BA-list of a SIM and satisfaction of the selection parameters by the SIM. In one implementation, the PMP recomputation SIM is identified based on the one or more selection parameters. Further, a first PMP recomputation message for the PMP recomputation SIM is sent. The first PMP recomputation message indicates a network controller to compute position of a paging message block for the PMP recomputation SIM based on the PMP recomputation SIM's Temporary Mobile Subscriber Identity (TMSI) number. The method further includes determining whether a switching criterion is satisfied for the PMP recomputation SIM and initiating a normal PMP computation procedure for the PMP recomputation SIM, when the switching criterion is satisfied. The second PMP recomputation message indicates to the network controller to compute PMP for the PMP recomputation SIM based on normal paging message position. In an example, the switching criterion includes one of a reconfiguration of one or more paging parameters for either of the SIMs or an occurrence of normal reselection of a cell for either of the SIMs.

In a second aspect, the invention concerns a computer program product comprising a computer readable medium, having thereon a computer program comprising program instructions. Further, the computer program is loadable into a data-processing unit and adapted to cause execution of the method according to the first aspect of the invention.

In a third aspect, the invention concerns a communication device adapted to be associated with at least two SIMs. The communication device includes a processor and a memory coupled to the processor. The memory includes a paging collision detection module configured to detect a probable paging collision between the two SIMs of the communication device. The memory further includes a forced cell reselection module configured to determine whether at least one SIM from the two SIMs of the communication device has a non-serving cell in its corresponding BA-list and ascertain whether the at least one SIM can be selected for a forced cell reselection, based on one or more selection parameters. Further, the forced cell reselection module is configured to indicate exclusion of a currently serving cell of the selected SIM from its normal cell reselection procedure and initiate the forced cell reselection for the selected SIM.

In one embodiment, the forced cell reselection module is configured to determine whether a switching criterion is satisfied for the selected SIM and indicate inclusion of the excluded cell for the normal cell reselection procedure for the selected SIM, when the switching criterion is satisfied.

Further, in one embodiment, the communication device further includes a PMP recomputation module configured to identify a PMP recomputation SIM, when at least one of selection criteria is not satisfied and send a first PMP recomputation message for the PMP recomputation SIM. The PMP recomputation message indicates a network controller to compute position of a paging message for the PMP recomputation SIM based on its TMSI number instead of IMSI. In one example, the PMP recomputation module is further configured to determine whether a switching criterion is satisfied for the PMP recomputation SIM and send a second PMP recomputation message to initiate a paging message computation process based on IMSI number associated with the PMP recomputation SIM, when the switching criterion is satisfied.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components. For simplicity and clarity of illustration, elements in the figures are not necessarily to scale. Some embodiments of devices and/or methods in accordance with embodiments of the present subject matter are now described, by way of example only, and with reference to the accompanying figures, in which.

DETAILED DESCRIPTION

Figure 1A:
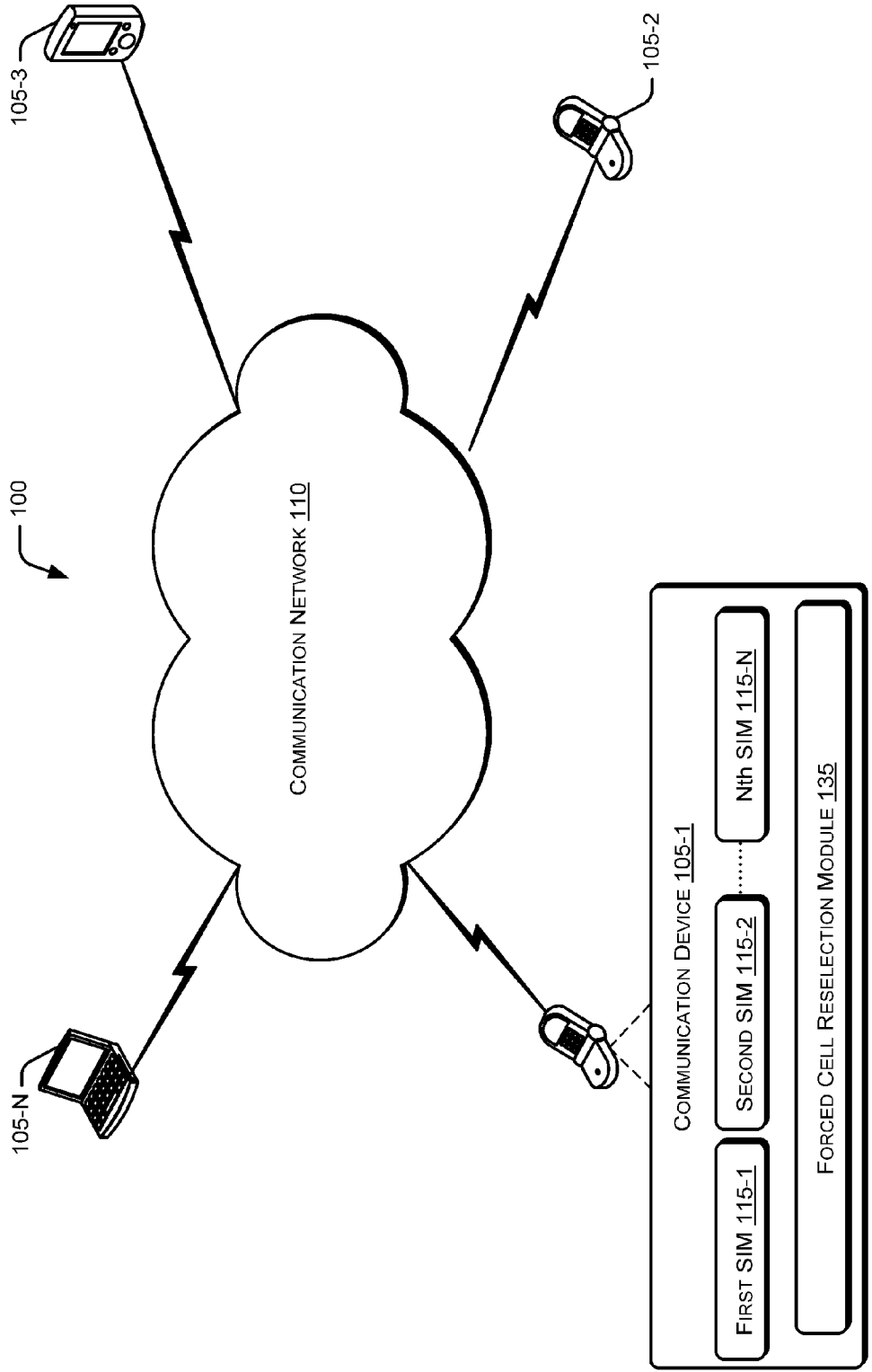
FIG. 1(a) illustrates a communication network environment, according to an embodiment of the present subject matter.

Typically, in a communication network, calling or receiving of the calls is assisted by a Subscriber Identity Module (SIM) provided in a wireless communication device of a user. The SIM, among other functions, identifies and subscribes the user to the communication network. Generally, in Circuit-Switched (CS) domain, a terminating call, i.e., a call directed towards a communication device, can be identified based on the SIM associated with the communication device and accordingly the terminating call may be forwarded to the communication device. Prior to establishing the terminating call with the communication device, the communication network sends a paging message to the communication device. Similarly, in packet-switched domain, to establish a packet downlink connection, paging message may be sent to the communication device. Once the paging message is sent, the network may expect a response from the communication device. In case the communication device fails to send a response, the network re-transmits the same paging message in the next paging occasion. For any communication device, the position of the paging message in a common control channel, can be determined by a network entity, for example, such network entity, in a Global System for Mobile communications (GSM) network is a base station controller (BSC). The position of the paging message can be determined based on certain parameters, for example, in case of GSM network the position can be determined based on BS_PA_MFRMS, which is selected by the network, and CCCH_GROUP & PAGING_GROUP, which are computed based on IMSI & BS_CC_CHANS. Like all other communication signals, the paging message is also received by a radio frequency device of the communication device. Generally, for establishing a terminating call or a packet DL connection, the paging message should have been successfully received by the radio frequency device.

Generally, multi-SIM Single-radio frequency (RF) wireless communication devices are configured to support multiple SIMs with a single RF device. Typically, in any wireless communication device, to facilitate communication among a communication device, the communication network, and other communication devices, each SIM of the communication device has to be camped onto one cell, which is referred to as its serving cell. Conversely, cells not serving the SIM but are part of the neighbor list of the SIM are referred as the non-serving cells. Further, every SIM maintains a list of all neighboring non-serving cells referred to as a broadcast control channel (BCCH) allocation list (BA-list).

In case of an event where paging messages are to be received by more than one of the SIMs at the same time in a communication device, where one RF device caters to multiple SIM, a paging collision may occur. For example, consider that a first SIM of a communication device is being served by a cell, say, cell 1, and a second SIM is being served by a second cell, cell 2. In case the position of the paging messages from cell 1 to SIM1 and cell 2 to SIM2, falls in the same time in the air interface, or with a gap of time interval, which may be too short for the radio frequency device to successfully receive both the paging messages concurrently, a paging collision may be said to have occurred. Typically, the RF device are generally capable of listening to only one frequency and timeslot at a time and hence receiving only one paging message at a time. Thus, in case of communication devices having multiple SIM, paging collisions may occur frequently. Consequently, a paging message for either of the SIM may be missed and subsequently a user may miss a call or packet downlink channel assignment. Further, in case the paging message is missed, say, paging message for the second SIM is missed, cell 2 may repeatedly send the paging message and it may take longer than expected to establish the terminating call or packet downlink connection.

Generally, in the multi-SIM mobiles currently available, in cases of paging collision, paging messages of the SIMs may be read alternately, i.e., a paging message for the first SIM may be read, then a paging message of the second SIM and then again a paging message of the first SIM. However, in this case, each SIMs paging message is missed alternately. Further, since the communication device does not know whether any paging message sent to it is empty, i.e., no valid paging or contains an actual paging message, it may so happen that the communication device may miss an actual paging of a SIM by sacrificing the RF device to another SIM whose paging message might be empty. Moreover, in cases where the paging collision occurs when one of the SIMs is in paging reorganization mode, i.e., a mode in which all the common control channel blocks from a cell have to be read for probable paging message, a SIM has to read all the paging messages and it may not be possible to alternately read paging messages of the SIMs.

According to an embodiment of the present subject matter, systems and methods for enabling whole reception by resolving paging collisions are described. Although the description may be explained with reference to two SIMs in a communication device, the description can be extended to any number of SIMs as well. In one implementation, a probable paging collision between two SIMs of the communication device is detected. Upon detection of the probable paging collision, it may be determined if at least one SIM of the communication device has at least one non-serving cell in a corresponding broadcast control channel (BCCH) allocation list (BA-list), based on the SIM priority and the cell signal strength criterion.

Generally, the SIMs within a multi-SIM wireless communication device are prioritized between themselves so as to determine which SIM should get priority when both the SIMs require the air interface (RF device) at the same time. In one embodiment, starting from the least priority SIM, each SIM's BA list may be checked for a non-serving cell with a threshold cell signal strength. If any such SIM is found, then that SIM may be selected for the forced cell re-selection and BA lists of rest of the SIMs may not be checked for non-serving cells suitable for forced cell reselection.

Further, once a SIM is selected for forced cell reselection, then its current serving cell may be excluded from the SIM's normal cell re-selection procedure and the SIM may be forced to reselect to the non-serving cell with the highest signal strength in its BA list and satisfying the cell signal strength criterion. Since, position of a paging message in a paging channel is determined based on certain cell parameters which are specific for each cell, the reselection of the cell for any of the SIMs results in change in position of the paging message in paging channel for that SIM, thereby resolving the existing paging collision between this SIM and any other SIM in the same wireless communication device. Further, since different cells' transmissions are not synchronized, the reselection to a new cell will result in a change in the timing offset difference between the cells' transmissions, thereby indirectly resolving existing paging collision.

However, in case none of the SIMs satisfies the criterion to be selected for forced cell reselection, then a first paging message position (PMP) recomputation message may be sent for a PMP recomputation SIM selected from among the two SIMs. Either of the two SIMs may be identified as the PMP recomputation SIM based on a selection parameter, for example SIM priority. The first PMP recomputation message requests a network controller to alter the procedure for computing position of a paging message for the PMP recomputation SIM.

Generally, position of the paging messages for a SIM is computed based on an International Mobile Subscriber Identity (IMSI) number of the SIM. In one implementation, the first PMP recomputation message requests the network controller to compute paging message position for the PMP recomputation SIM based on a Temporary Mobile Subscriber Identity (TMSI) number instead of the IMSI number. Since, the computation of the position of the paging message is now based on a different variable, it provides for a change in the position of the paging message. Thus, the two paging messages, which initially could have collided, would now be received by the communication device at different time instances thereby preventing a paging collision.

Thus, the systems and methods of the present subject matter facilitate prevention of the paging collision in a communication device having multiple SIMs. Thus, a user of the communication device does not miss any calls or packet channel assignments and the time taken to establish a call or a packet downlink connection may be reduced compared to a case when a paging collision occurs. Further, if one of the SIMs is in the paging reorganization mode, a serving cell change for either of the SIMs or a recomputation of position of the paging message for either of the SIMs, may avoid the paging collision.

The systems and methods can be implemented in a variety of communication devices. The communication devices that can implement the described method(s) include, but are not limited to, cellular phones, smart phones, personal digital assistants (PDAs), hand-held devices, portable computers, and the like. Additionally, the method can be implemented in any of the communication networks, such as Global System for Mobile Communication (GSM) network, General packet radio service (GPRS) network, Code Division Multiple Access (CDMA) 2000 network, Time Division-Code Division Multiple Access (TD-CDMA), Time Division-Synchronous Code Division Multiple Access (TD-SCDMA), Wideband Code Division Multiple Access (WCDMA), or other air interface standards supported by Universal Mobile Telecommunications System (UMTS). Although the description herein is with reference to certain networks, the systems and methods may be implemented in other networks and devices, albeit with a few variations, as will be understood by a person skilled in the art.

Further, it should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Moreover, all statements herein reciting principles, aspects, and embodiments of the present subject matter, as well as specific examples thereof, are intended to encompass equivalents thereof.

It will be appreciated by those skilled in the art that the words during, while, and when as used herein are not exact terms that mean an action takes place instantly upon an initiating action but that there may be some small but reasonable delay, such as a propagation delay, between the initial action, and the reaction that is initiated by the initial action. Additionally, the word "connected" is used throughout for clarity of the description and can include either a direct connection or an indirect connection. The descriptions and details of well-known components are omitted for simplicity of the description.

Figure 1B:
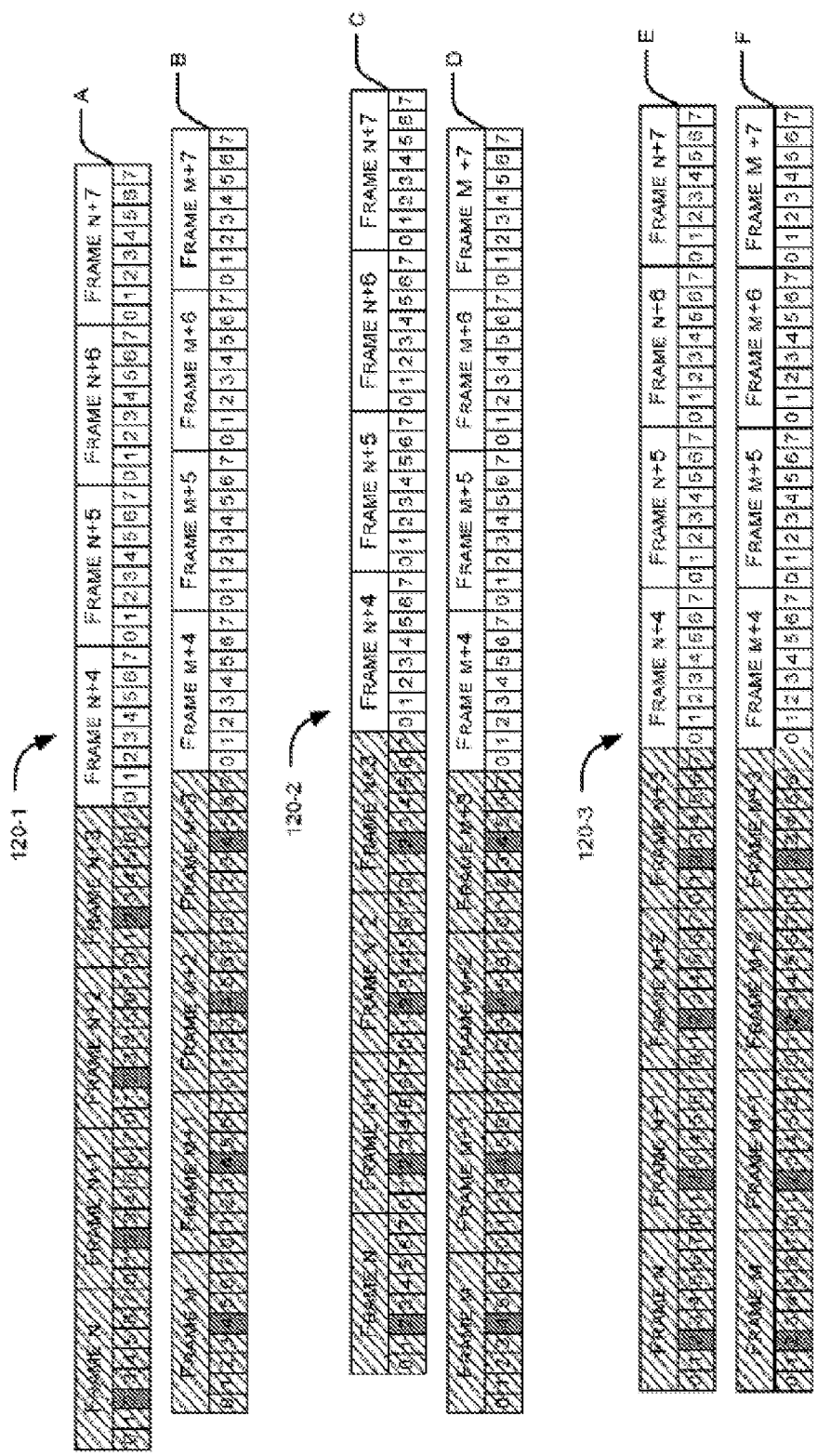
FIG. 1(b) illustrates various examples of paging collisions, according to an embodiment of the present subject matter.
Figure 1B:
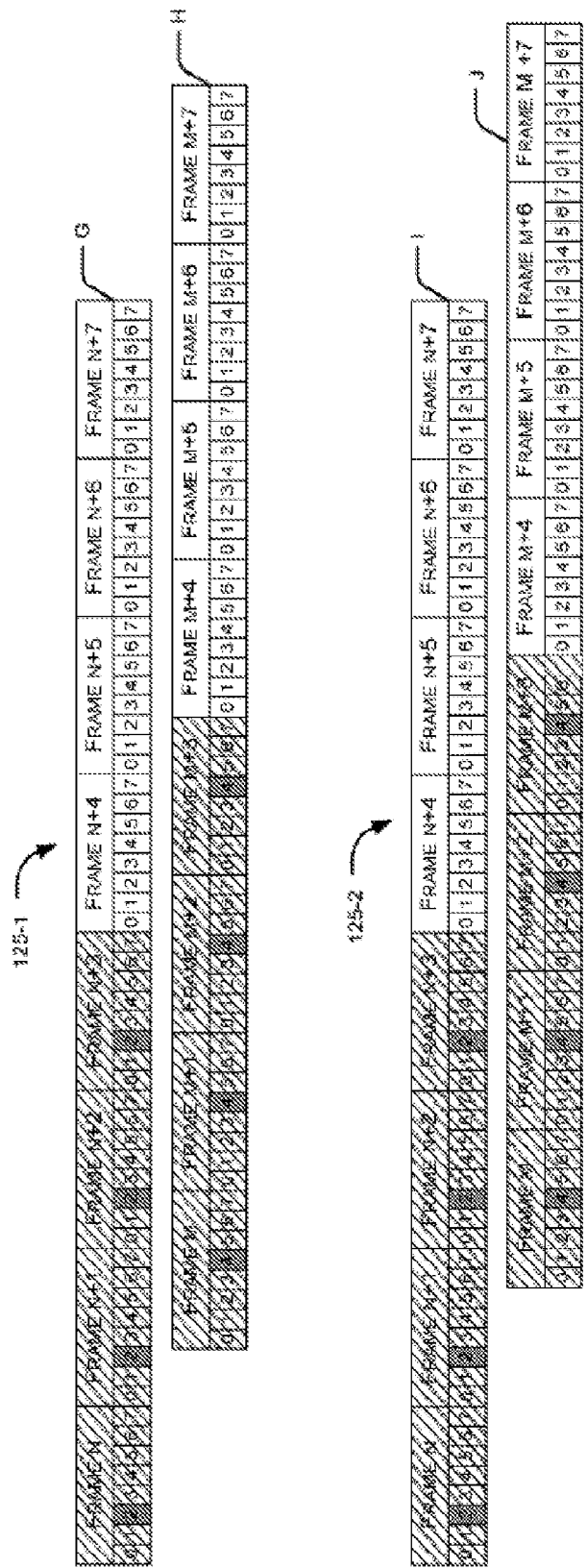

FIG. 1 illustrates a communication network environment 100, according to an embodiment of the present subject matter. The communication network environment 100 includes one or more communication devices 105-1, 105-2, 105-3, and 105-N (collectively referred to as communication devices 105) communicating with each other through a communication network 110. The communication devices 105 are physical equipments used by a caller party and a called party to communicate with each other. The communication devices 105 may include, without limitation, mobile phones, portable computers, smart phones, PDAs, hand-held devices, notebook, and the like. Each of the communication devices 105 works on a communication protocol as defined by the communication network 110 to which the communication device 105 is coupled.

In one implementation, the communication network 110 is a wireless communication network. The communication network 110 can be a collection of individual networks, interconnected with each other and functioning as a single large network. Examples of such individual networks include, but are not limited to, Global System for Mobile Communication (GSM) network, Universal Mobile Telecommunications System (UMTS) network, Time Division Multiple Access (TDMA) network, Code Division Multiple Access (CDMA) network, Next Generation Network (NGN), and Integrated Services Digital Network (ISDN). Depending on the technology, the communication network 110 includes various network entities, such as gateways, routers; however, such details have been omitted for ease of understanding.

In one implementation, a communication device, say the communication device 105-1 is configured to support multiple subscriber identity module (SIMs) for example, a first SIM 115-1, a second SIM 115-2, and so on. The multiple SIMs, in one embodiment may be in the form of physical SIMs. It will be appreciated that the SIM may be provided in form of a SIM software and/or as a virtual SIM as well. For the sake of clarity, the present description is explained with reference to a first SIM 115-1 and a second SIM 115-2, collectively referred to as SIMs 115; however it will be understood that the communication device 105-1 may include more than two SIMs as well. The SIMs 115 may be registered with same or different service providers to receive respective paging messages to establish a terminating call or a packet downlink connection, while in idle mode.

It will be understood that either of the two SIMs 115 may be the first SIM 115-1 or the second SIM 115-2. For example, the communication device 105-1 may include a first slot for the first SIM 115-1 and a second slot for the second SIM 115-2. Based on the slot in which a SIM may be inserted, it may be determined, which is the first SIM and which is the second one. Additionally, each of the slots may have a SIM priority associated with it, for instance, the first slot may have a low priority, while the second slot may have a high priority. So, when the first SIM 115-1 is inserted in the first slot it may identified as the low priority SIM and the second SIM 115-2 as the high priority one.

In an example, the first SIM 115-1 may be registered with a first service provider and may be served by a cell, say, cell 2 and the second SIM 115-2 may be registered with a second service provider and may be served by another cell, say, cell 5. Consider a case where the communication device 105-2 is attempting to call a SIM, say, the first SIM 115-1 of the communication device 105-1 and the communication device 105-3 is attempting to call the second SIM 115-2 of the communication device 105-1 at the same time. In such case there is a likelihood that a first paging message sent by cell 2, to indicate to the first SIM 115-1 that a terminating call is to be established, will overlap in time with a second paging message sent by cell 5 to second SIM 115-2, thereby resulting in a paging collision.

As mentioned previously, a paging message may be sent to establish a communication channel between the communication network 110 and a communication device, say, the communication device 105-1. In GSM, the paging message may be sent over a paging channel (PCH) on a common control channel (CCCH). Thus, the communication device 105-1 needs to monitor a PCH on the CCCH. The PCH having the paging message is sent by a network controller of the communication network 110, for example, BSC in GSM networks, in a particular format. The CCCH is segmented into a plurality of equal intervals of time and frequency, for instance, GSM technology uses a concept of 51 multiframes, where each frame is 4.615 milliseconds (msec) in duration. A frame may further be segmented into eight time slots.

Further, a paging message is typically spread over a predefined number of frames, i.e., a group of the predefined number of frames in combination form a paging message. In other words, to read a paging message, the predefined numbers of the frames are to be read in succession. For example, in the GSM technology the paging message is spread over four frames and a group of these four frames forms a complete paging message and may be referred to as a paging block. Further, the 51 multiframes may include multiple paging messages. Typically, the position of the paging message on the CCCH is determined by the network controller. The position of the paging message on the PCH for a SIM may be determined based on the International Mobile Subscriber Identity (IMSI) number associated with the SIM and certain cell parameters of the cell currently serving the SIM. Thus, the frame and the time slot in which paging message is sent may be determined based on the IMSI number and the cell parameters.

A paging collision can be either of a 'complete overlap' 120, a 'partial overlap' 125. Examples of paging collisions in GSM network are illustrated in FIG. 1(*b*). In FIG. 1(*b*), frames with hatched lines indicate the frames having a paging message; and a time slot that the communication device 105-1 has to read to get the paging message for a SIM has a dotted filling pattern. Further, paging message can occur in timeslots 0, 2, 4 and 6.

For the sake of explanation, let the first SIM 115-1 be camped on a cell, say, cell 0 and the second SIM 115-2 on another cell, say, cell 1. FIG. 1*b* shows downlink transmissions from cell 0 and cell 1. Frame 'N', 'N+1', 'N+2', 'N+3' represent the first, second, third and fourth frame of a paging message or paging block from cell 0. Similarly, frame 'M', 'M+1', 'M+2' and 'M+3' represent the first, second, third and fourth frame of a paging message or block from cell 1. Further it will be understood that the transmissions of cell 0 and cell 1 may or may not be frame-aligned with each other. Also, the transmissions of cell 0 and cell 1 may or may not be timeslot-aligned with each other.

The complete overlap 120 may occur in scenarios where all the four frames of cell 0 overlap with all frames of cell 1, frame N of cell 0 overlaps with frame M of cell 1, frame N+1 overlaps with M+1, frame N+2 overlaps with M+2, etc. The complete overlap 120 can be understood with the help of various examples. For example, consider a first complete overlap 120-1, where frames overlap but timeslots carrying paging messages do not overlap. As illustrated in FIG. 1(b), the paging in cell 0 is on time slot 2 and in cell 1 on time slot 4. Further, it can be observed that frame N, frame N+1, frame N+2, and frame N+3 of the paging message in cell transmission 'A' overlap with frame M, frame M+1, frame M+2, and frame M+3 of the paging message in cell transmission 'B', thereby resulting in a paging collision with complete overlap. Moreover, though the frame N of cell 0 overlaps with frame M of cell 1, frame N+1 with frame M+1 and so on; however their timeslots carrying their respective paging message do not overlap. In said example, though the cell transmissions of cell 0 start ahead in time compared to cell transmissions of cell 1, it will be understood that cell transmissions of cell 1 can also start ahead in time compared to transmissions of cell 0.

In another example, consider a second complete overlap 120-2 where four frames of the paging message in cell transmission 'C' from cell 0 overlap with the four frame of the paging message in cell transmission 'D' from cell 1; and at the same time the timeslots carrying paging messages for the first SIM 115-1 and the second SIM 115-2 also overlap with each other. In yet another example, consider a third complete overlap 120-3, where the cell transmissions 'E' and 'F' are frame as well as timeslot aligned.

Referring to the partial overlap 125, a partial overlap can be understood as a case where all the four frames of a paging message of cell 0 do not overlap with four frames of a paging message of cell 1. Similar to the complete overlap 120, the partial overlap 125 can understood with the help of various examples. For example, consider a first partial overlap 125-1, where partial overlap between a paging message in a serving cell transmission 'G' for the first SIM 115-1, and a paging message in the serving cell transmission 'H' for the second SIM 115-2, is illustrated. The paging message in the cell transmission 'G' overlaps with the paging message in the cell transmission 'H' such that only few frames of the paging message 'G' overlap with the paging message 'H'. As it can be seen, frame N+1, frame N+2, and frame N+3 of the paging message 'G' overlap with frame M, frame M+1, and frame M+2 of the paging message in the cell transmission 'H', however frame N in the cell transmission 'G' does not overlap with any of the frames in the cell transmission 'H', thereby resulting in a paging collision because of the partial overlap 125-1.

In said example, though the cell transmissions 'G' start ahead in time compared to cell transmission 'H', it will be understood that cell transmissions of cell 1 may start ahead in time compared to transmissions of cell 0. Further, for the first partial overlap 125-1, though it has been illustrated that 3 out of 4 frames overlap between the paging message of the first SIM 115-1 and the paging message for the second SIM 115-2, it will be understood that the partial overlap 125 also includes cases where 1 out of 4, or 2 out of 4 frames of the paging message overlaps between the transmissions of both SIMs 115-1 and 115-2.

In another example, consider a second partial overlap 125-2, where frames having the paging messages in cell transmission 'I' and 'J' overlap such that some of the time slots overlap. As illustrated, though frame N+1, frame N+2, and frame N+3, of the paging message in cell transmission 'I' overlap with frame M, frame M+1, and frame M+2, of the paging message in cell transmission 'J' but time slots of only two of these frames overlap. As illustrated, time slot 2 of frames N+2 and N+3 overlap with time slot 4 with frames M and M+1 respectively. In such a case, the radio frequency device of the communication device 105-1 may not be capable of switching between frequencies at a time slot basis, resulting in a paging collision.

Although the description of the paging collision is discussed in detail with reference to GSM network, it will be understood that the same principles can be extended to other networks as well.

In order to evade the paging collisions, the communication device 105-1 includes, among other things, a forced cell reselection module 135. In one implementation, a probable paging collision may be detected by the communication device 105-1. Upon detecting the probable paging collision, the forced cell reselection module 135 attempts to select a SIM which can do a forced cell reselection so as to resolve the existing paging collision. The forced cell reselection module 135, may check if either of the SIMs 115 have a cell in their broadcast control channel (BCCH) allocation (BA)-list, which is a list of frequencies of neighboring cells. In one implementation, this check may be done starting with the lowest priority SIM, and if the SIM is found not suitable for forced-cell-reselection, then proceeding with the check for non-serving cell for the next low priority SIM in the multi-SIM communication device 105-1. Once a SIM of the communication device 105-1, is camped on a cell, called as a serving cell, the SIM will continuously monitor the strength of the serving cell and the neighbor cells, also called as the non-serving cells. In the present case, since the communication device 105-1 includes multiple SIMs 115, the communication device 105-1 may be camped on to more than one cell. As part of the system information, every BCCH sends out a list of the neighboring cells, and the communication device 105-1 measures the signal strength to make a sorted list of monitored cells, which becomes a BA list for a corresponding of the communication device 105-1.

In case where either of the SIMs 115 includes a non-serving cell in their corresponding BA-list, the forced cell reselection module 135 may identify one of the SIMs 115 for the forced cell reselection, based on one or more selection parameters. Examples of selection parameters include, but are not limited to, SIM priority and cell signal strength. The selection parameters are chosen such that subsequent to the assertion performed by the forced cell reselection module 135, either of the SIMs 115 is selected, or neither of the SIMs 115 is selected for the forced cell reselection.

In case one of the SIMs 115 is identified as a potential candidate for forced cell reselection, the forced cell reselection module 135 initiates a forced cell reselection for this SIM. For example, if the first SIM 115-1 is the selected SIM, then the non-serving cell with strongest signal strength in the BA-list of the first cell 115-1 is identified as the cell to be forced cell reselection SIM and the forced cell reselection for the first SIM 115-1 is initiated such that after reselection, the first SIM 115-1 may be served by the non-serving cell with the highest signal strength in its BA-list. For example, consider that cell 2 is the serving cell for the first SIM 115-1, and the non-serving cell having maximum signal strength among the cells in the BA-list of the first SIM 115-1, where the signal strength is greater than or equal to threshold signal strength, is cell 5. In said example, subsequent to the forced cell reselection, the first SIM 115-1 will be served by cell 5.

As mentioned previously, frame and time slot in which the paging message is carried may be determined by the network controller based-in-part on cell parameters, which are specific for each cell. Thus, the position of paging message may vary from cell to cell. Accordingly, once a currently serving cell is switched with a new cell, the position of a paging message is changed and in turn the paging message for one SIM, say, the first SIM 115-1 does not overlap in time with the paging message for the second SIM 115-2. Further, to prevent the first SIM 115-1 from switching back to cell 2, which may be having a higher signal strength than the reselected cell, the forced cell reselection module 135 may indicate exclusion of the cell 2 for a normal cell reselection procedure for the first SIM 115-1.

In one implementation, in case it is determined that neither of the SIMs 115 satisfy selection criteria, i.e., neither of the SIMs 115 has a non serving cell in their corresponding BA-list or neither of the SIMs 115 can be selected for forced-cell-reselection due to the cell signal strength, then the communication device 105-1 requests a Mobile Switching Center (MSC) to instruct the network controller to alter the paging message computation position for one of the SIMs 115. In response to the request, the network controller of the serving cell computes paging message position based on Temporary Mobile Subscriber Identity (TMSI) instead of IMSI of corresponding SIM. Since, the paging message position is now based on TMSI instead of IMSI for one the SIMs, the paging message for the first SIM 115-1 does not overlap in time with the paging message for the second SIM 115-2, thereby evading the paging collision.

Figure 2:
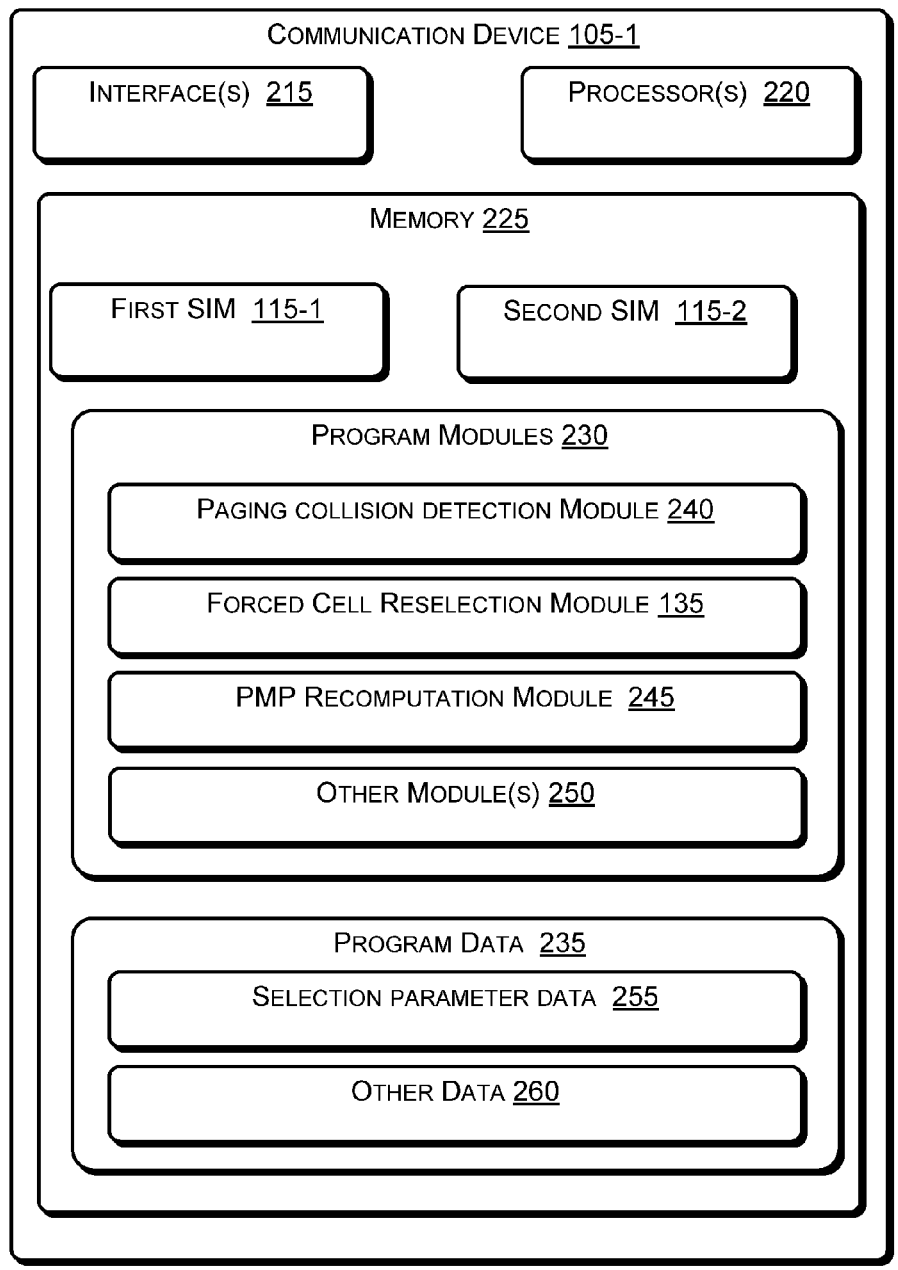
FIG. 2 illustrates a communication device configured to enable whole paging reception on multi-SIM communication devices, according to an embodiment of the present subject matter.

FIG. 2 illustrates components of the communication device 105-1 configured to evade paging collisions, according to an embodiment of the present subject matter. The communication device 105-1 includes interface(s) 215, one or more processor(s) 220, and a memory 225 coupled to the processor 220. The interfaces 215 may include a variety of software and hardware interfaces, for example, interfaces for peripheral device(s), such as ear phones, an external memory, and an external computing device. The interface 215 can facilitate multiple communications within a wide variety of networks and protocol types, including wired networks, for example local area network (LAN), cable, etc., and wireless networks such as Wireless LAN (WLAN), cellular, or satellite. The processor 220 can be a single processing unit or a combination of multiple processing units. The processor 220 may be implemented as one or more microprocessors, microcomputers, microcontrollers, digital signal processors, central processing units, state machines, logic circuitries, and/or any devices that manipulate signals based on operational instructions. Among other capabilities, the processor 220 is configured to fetch and execute computer-readable instructions stored in the memory 225.

The memory 225 may include any computer-readable medium known in the art including, for example, volatile memory such as SRAMs and DRAMs and/or non-volatile memory such as EPROMs and flash memories. The memory 225 includes program module(s) 230 and program data 235. In one implementation, the program module(s) 230 include, for example, a paging collision detection module 240, the forced cell reselection module 135, a paging message position (PMP) recomputation module 245, and other module(s) 250. It will be appreciated that each of the program module(s) 230 can be implemented as a combination of one or more different modules. The other module(s) 250 include programs that supplement applications or functions performed by the communication device 105-1. The program data 235 serves, amongst other things, as repository for storing data pertinent to functioning of the program modules 230. The program data 235 includes selection parameter data 255 and other data 260.

The other data 260 includes data generated as a result of the execution of one or more modules in the other modules 250.

In order to make and receive calls or exchange data, the communication device 105-1 is registered with a cell of the communication network 110. The PCH may include paging messages for multiple communication devices 105. However, the communication device 105-1 is not required to read all the paging messages and may read the ones which are corresponding to the SIM of the communication device 105-1. Typically, a paging indicator may be sent by the network controller to indicate to the communication device 105-1 that a paging message may be found in the PCH. In order to reduce power consumption of the communication devices 105, paging groups are defined by the network controllers and a communication device listens to paging sub-channels corresponding to the paging group.

The communication device 105-1, in idle mode to save on power, periodically checks for the paging indicator. Once the paging indicator is detected, the communication device 105-1, listens to the paging sub-channels corresponding to it's paging group. In GSM, GPRS, and UMTS networks periodic checking of the paging indicators is referred to as discontinuous reception (DRX) mode, while in CDMA this is referred to as slotted mode. In order to determine paging message position on the PCH, the communication device 105-1 computes a CCCH group and a paging group for CCCH for its corresponding SIM 115. Each of the CCCH carries the paging messages for the communication devices 105 belonging to the CCCH group. Accordingly, the communication devices 105 belonging to a particular CCCH group listen to CCCH corresponding to that CCCH group. The CCCH group indicates a time slot of the frame carrying the paging message for the SIM and accordingly the communication device 105 listens to the time slot indicated by the CCCH group to get the paging message. It will be understood that in a non-power saving mode, the communication device 105-1 may listen to all the frames of the CCCH to detect the paging message.

In one implementation, the paging collision detection module 240 is configured to detect a probable paging collision in the communication device 105-1. In order to determine if any of the SIMs 115 has a paging message, the paging collision detection module 240 periodically monitors for a paging indicator for the SIMs 115. Once the paging indicator is detected, the paging collision detection module 240 may determine paging message position of a paging message, which is to be received.

For example, for GSM networks, the paging collision detection module 240 may determine the paging message position based on following equations:

$$\text{CCCH\_GROUP}(0 \ldots \text{BS\_CC\_CHANS}-1) = ((\text{IMSI} \bmod 1000) \bmod (\text{BS\_CC\_CHANS} \times N)) \text{div } N \quad (1)$$

$$\text{PAGING\_GROUP}(0 \ldots N-1) = ((\text{IMSI} \bmod 1000) \bmod (\text{BS\_CC\_CHANS} \times N)) \bmod N \quad (2)$$

where CCCH_GROUP represents a mapping to the timeslots used for paging, N is number of paging blocks available on one CCCH and N=(number of paging blocks available in a 51 multiframe on one CCCH)×BS_PA_MFRMS, PAGING_GROUP represents a paging group of the SIM under consideration. Typically, a cell serves multiple communication devices, these communication devices may be grouped into groups referred to as paging groups, IMSI is the International Mobile Subscriber Identity of a SIM for which paging message is to be read, 'mod' represents a modulo operation, 'div' represents an integer division, BS_CC_CHANS is a cell parameter, which is specific to each cell. The BS_CC_CHANS determines number of physical channels in a CCCH and is broadcast in the BCCH, and BS_PA_MFRMS is a cell parameter, which is specific to each cell. BS_PA_MFRMS defines the number of sets 51 multi-frames between the transmissions of paging messages to communication devices belonging to the same CCCH group. For example, if the value of BS_PA_MFRMS is 3, then after three sets of 51 multiframes, a communication device 105-1 of the same paging group will read the paging message.

Further, the specific multi-frame carrying paging message corresponding to a SIM of the communication device 105-1 is computed using following equation:

$$PAGING\_GROUP \text{ div}(N \text{ div } BS\_PA\_MFRMS) = (FN \text{ div } 51) \text{mod}(BS\_PA\_MFRMS) \quad (3)$$

Additionally, a paging block index, which is used to determine the PCH block to be monitored may be determined using following equation:

$$\text{Paging Block Index} = PAGING\_GROUP \text{ mod}(N \text{ div } BS\_PA\_MFRMS) \quad (4)$$

Although the detection of paging message position is explained in detail with reference to GSM network, it will be understood that the same principles can be extended to other networks, such as, GPRS and CDMA as well.

For example, for GPRS, a paging group can be determined using following equation:

$$PCCCH\_GROUP(0 \ldots KC-1) = ((IMSI \text{ mod } 1000) \text{ mod}(KC \times N)) \text{div } N \quad (5)$$

$$PAGING\_GROUP(0 \ldots M-1) = (((IMSI \text{ mod } 1000) \text{div } (KC \times N)) \times N + (IMSI \text{ mod } 1000) \text{mod } N + \text{Max}((m \times M) \text{div}(SPLIT\_PG\_CYCLE, m)) \text{mod } M \quad (6)$$

for m=0, ..., Min(M, SPLIT_PG_CYCLE)-1,
where, KC=number of (P)CCCH in the cell=BS_PCC_CHANS for PCCCH
BS_CC_CHANS for CCCH;
M=number of paging blocks "available" on one (P)CCCH=
(12−BS_PAG_BLKS_RES−BS_PBCCH_BLKS)*64 for PCCCH
(9−BS_AG_BLKS_RES)*64 for CCCH not combined
(3−BS_AG_BLKS_RES)*64 for CCCH+SDCCH combined;
N=1 for PCCCH
(9−BS_AG_BLKS_RES)*BS_PA_MFRMS for CCCH not combined
(3−BS_AG_BLKS_RES)*BS_PA_MFRMS for CCCH/SDCCH combined;
SPLIT_PG_CYCLE is an MS specific parameter negotiated at GPRS attach;
IMSI is the International Mobile Subscriber Identity of a SIM for which paging message is to be read;
'mod' represents a modulo operation; and 'div' represents an integer division.

Further, for GPRS, the specific multiframe carrying paging message corresponding to the SIM of the communication device 105-1 may be computed using following equation:

$$PAGING\_GROUP \text{ div}(M \text{ div } 64) = (FN \text{ div } MFL) \text{mod} (64) \quad (7)$$

where MFL=multiframe length=51 for CCCH or 52 for PCCCH

Additionally, the paging block index may be computed using following equation:

$$\text{Paging Block Index} = PAGING\_GROUP \text{ mod}(M \text{ div } 64) \quad (8)$$

Similarly, for WCDMA and TD-SCDMA paging occasions can be determined using IMSI; the number of available Secondary Common Control Physical Channel (SCCPCH) which carry a PCH (K); the Cell System Frame Number (SFN); Np, where for frequency division duplex (FDD), Np is the number of page indicators within a frame and for time division duplex (TDD), Np is the number of page indicators within a paging block; Frame offset, where for FDD, Frame offset=0 and for TDD, pilot channel (PICH) frame offset values are given in system information; PBP and the DRX cycle length. The paging occasions may be computed using following equation:

$$\text{Paging Occasion} = \{(IMSI \text{ div } K) \text{mod}(DRX \text{ cycle length div PBP})\} \times PBP + n \times DRX \text{ cycle length} + FrameOffset \quad (9)$$

where, n=0, 1, 2 . . . as long as SFN is below its maximum value.

Further, an actual paging indicator, for the communication device 105-1, within a paging occasion can be determined using following equation:

$$\text{Page Indicator} = DRX \text{ Index mod } N_p \quad (10)$$

where DRX Index=IMSI div 8192.

Further, in FDD mode, Np=(18, 36, 72, 144) is the number of page indicators per frame, and is given in information element (IE) part of system information. In TDD mode, Np is the number of page indicators per paging block and is calculated by the paging indicator length (LPI), the burst type, which can be long or short midamble for 3.84 Mcps TDD; and the PICH repetition length, which are given in system information. It will be appreciated that the corresponding considerations may be derived for CDMA2000.

In one implementation, the paging collision detection module 240 computes paging block position for both the SIMs 115. Upon computation, if the paging collision detection module 240 determines that the paging message for the first SIM 115-1 will overlap with a paging message for the second SIM 115-2, a probable paging collision may be detected. As mentioned previously, the paging collision may include complete overlap 120 or a partial frame overlap 125.

Upon detecting the probable paging collision, the forced cell reselection module 135 determines if at least one of the SIMs 115 includes a non-serving cell in a corresponding BA-list. In one implementation, the forced cell reselection module 135 determines if the first SIM 115-1 has a non-serving cell in its corresponding BA-list. In case it is determined that the first SIM 115-1 has a cell in its BA-list, the forced cell reselection module 135 may identify whether the first SIM 115-1 can be selected based on one or more selection parameters. The selection parameters may be stored in the selection parameter data 255.

In one example, cell signal strength may be considered as the selection parameter. In said example, the forced cell reselection module 135 may identify if the non-serving cell having the highest signal strength in the BA-list has a signal strength greater than a threshold signal strength. For example, the threshold signal strength can be taken as a signal strength which is comparable to a signal strength of a currently serving cell, say, the signal strength of the non serving cell is less than the signal strength of a currently serving cell within a predetermined amount, say, 10 dBm. In another example, the threshold signal strength may be a signal strength, which may be high enough to establish a call with the required quality, for instance, the threshold signal strength may be −85 dBm. If it is identified that the non-serving cell for the first SIM 115-1 has signal strength greater than or equal to the threshold signal strength, the first SIM 115-1 may be selected and the non-serving cell as the reselected cell.

Thus, in said implementation, if the SIM priorities are such that the first SIM 115-1 has the lowest priority, then the check for suitable non-serving cell is first done for the first SIM 115-1. In case a suitable non-serving cell is found in the BA-list of the first SIM 115-1 then, instead of checking the same for the second SIM 115-2, the forced cell reselection module 135 may trigger a forced cell reselection for the first SIM 115-1. In case no suitable non-serving cell is found in the BA-list for the first SIM 115-1, it may be determined if the second SIM 115-2 has a non-serving cell in the BA-list. If the second SIM 115-2 has a non-serving cell in its BA-list, then the second SIM 115-2 may be selected for forced-cell-reselection.

As mentioned previously, the selection parameters may be so chosen that in case both the SIMs 115 have a cell in their BA-list, only one of them is selected for the forced cell reselection. For example, in such a case, the selection parameter may be SIM priority. In case both the first SIM 115-1 and the second SIM 115-1 have a non-serving cell in the BA-list then a SIM with a low priority may be selected. In another example, signal strength may be one of the selection parameter. Again, in case both the SIMs 115 have a non-serving cell in the BA-list then a SIM whose non-serving cell has a higher signal strength may be selected for the forced cell reselection. Additionally, it may be required that the SIMs 115 may also have the threshold signal strength. Therefore, in case though a SIM, say, a first SIM 115-1 may have a non serving cell in the BA-list with a signal strength higher than a second non-serving cell present in the BA-list of the second SIM 115-2, the first SIM 115-1 may not be selected for the forced cell reselection if the signal strength of the first non-serving cell is less than the threshold signal strength.

In yet another example, the selection parameters considered for the cell reselection may be a combination of the SIM priority and the signal strength. Further, in such a case one parameter may override other. For example, if it is determined that both the SIMs 115 have a non-serving cell in their BA-list, it may be identified whether any of the first SIM 115-1 or the second SIM 115-1 is a candidate for forced cell reselection based on the selection parameters. Considering that SIM priority overrides signal strength, it may be ascertained which of the two SIMs 115 has low priority and subsequently, it may be ascertained if the non-serving cell of the low priority SIM has a threshold signal strength. In case the non-serving cell for the low priority SIM has the threshold signal strength, the low priority SIM is identified as the selected SIM. However, if it is ascertained that the low priority SIM does not have the threshold signal strength, then an assertion is made for the high priority SIM to check if the non-serving cell of high priority SIM has the threshold signal strength. If it is determined that the non-serving cell of high priority SIM has the threshold signal strength, the high priority SIM is selected for the forced cell reselection. Alternately, none of the SIMs 115 can also be selected.

Once the SIM for forced cell reselection is identified, the forced cell reselection module 135 may initiate a forced cell reselection for that SIM. In one implementation, the forced cell reselection module 135 initiates selection of the non-serving cell present in the corresponding BA-list as the new serving cell. As mentioned earlier, the non-serving cell may be the cell with maximum signal strength in the BA-list. In response to the forced cell reselection, the selected non-serving cell now becomes the serving cell for the selected SIM. The reselection of the serving cell provides for change in cell parameters, which in turn alter the paging message position.

Further, typically, cells in a network may not be synchronized and have some time offset difference between their cell transmissions, i.e., say frame f1 of cell 1 and frame f1 of cell 2 may not start at the same time, t1. As a result, when a cell is switched, change in the cell parameters and time offset provide for change in the position of the paging message in PCH for the SIM for which forced cell reselection is performed, thereby resolving the paging conflict. For example, in GSM networks, the cell parameters include BS_CC_CHANS and BS_PA_MFRMS and it may be observed from equations (1) to (4) that a change in the cell parameters provides for change in the position of the paging message.

Further, in one implementation, once the forced cell reselection has occurred for the selected SIM, to prevent the selected SIM from automatically switching back to the cell serving it prior to the forced cell reselection, the forced cell reselection module 135 indicates exclusion of the previously serving cell in the BA-list of the selected SIM. For example, previously serving cell may be marked as "excluded" in the BA-list. Consequently, in one implementation, for normal cell reselection procedure, the previously serving cell may not be considered thereafter.

In one implementation, if the forced cell reselection module 135 determines that a switching criterion is satisfied then, the forced cell reselection module 135 may indicate to include the excluded cell for normal cell reselection procedure for the SIM, for which the forced cell reselection was performed, thereafter. In one example, the excluded cell may now be unmarked from being excluded and can thereafter be considered for the normal cell reselection procedure. The switching criterion can be, for example, reconfiguration of one or more cell parameters for either of the SIMs 115 by the network controller and occurrence of reselection of a cell for either of the SIMs 115. The cell parameters that can be reconfigured are, for example, BS_PA_MFRMS as indicated in equation (3) and (4), and N as indicated in equation (1) and (2). In one implementation, if the forced cell reselection module 135 determines that neither of the SIMs 115 satisfies criteria for a forced-cell reselection, then the paging message position (PMP) recomputation module 245 may send a first PMP recomputation message for either of the SIMs 115. The PMP recomputation module 245 may select a SIM, for example, the first SIM 115-1, for the paging message position computation based on one or more selection parameters like SIM priority. For example, the PMP recomputation module 245 may select the first SIM 115-1 for the paging message position computation if it has the lowest SIM priority. The first SIM 115-1 selected for paging message position recomputation may be referred to as PMP recomputation SIM.

Upon identifying the PMP recomputation SIM, the PMP recomputation module 245 may send a request to the MSC serving the PMP recomputation SIM for which paging message position computation at the network controller is to be changed. The first PMP recomputation message indicates the network controller to compute a position of a paging message for the PMP recomputation for the SIM based on TMSI instead of IMSI. Since, the computation of position of the paging message is based in part on the IMSI, therefore, when IMSI is replaced by TMSI and, the position of the paging message is altered and the paging collision can be prevented.

In one implementation, the PMP recomputation module 245 may be configured to send the first PMP recomputation message in a location update message, which is sent to the MSC. The location update message having the first PMP recomputation message has been explained in detail with reference to the GSM network, however it will be understood that the same principles can be extended to location updates messages or any other message carrying the first PMP recomputation message for other networks. In GSM networks, location update request message has an Information element (IE) named Location Updating type, which is of length eight bits. The first two least significant bits indicate location updating type (LUT). The LUT may indicate "normal location updating", "periodic updating", "IMSI attach", and "reserved" based on the values of the first two least significant bits. Further, a sixth most significant bit or the third least significant bit is a spare bit.

In order to send the first PMP recomputation request, the PMP recomputation module 245 uses the spare bit in the location update message. For example, in the first PMP recomputation request, when the spare bit has value "1" it may indicate that the PMP is to be recomputed based on TMSI, while the spare bit value "0" may indicate it to be the usual location update request, sent for normal location update or periodic location update or IMSI-attach. Typically, location update messages are sent by the communication device 105-1 either on a periodic basis or when the user's location area changes. In such a case, the LUT may take an appropriate value based on normal procedure for determining the LUT. However, in case the location update message is to be sent only for the PMP recomputation purposes, then the first two least significant bits may take values such that the LUT indicates "reserved".

Thus, once a PMP recomputation SIM is identified, the PMP recomputation module 245 may send the location update message to indicate to the MSC that PMP is to be recomputed. The MSC then instructs a BSC serving the PMP recomputation SIM to compute the PMP based on TMSI. For example, in GSM networks, the computation of the paging group and CCCH group may be based on following equations:

$$\text{CCCH\_GROUP}(0 \ldots \text{BS\_CC\_CHANS}-1) = ((\text{TMSI mod } 1000) \text{mod}(\text{BS\_CC\_CHANS} \times N)) \text{div } N \quad (11)$$

$$\text{PAGING\_GROUP}(0 \ldots N-1) = ((\text{TMSI mod } 1000) \text{mod}(\text{BS\_CC\_CHANS} \times N)) \text{mod } N \quad (12)$$

Similarly, for GPRS networks, the computation of the paging group and PCCCH group may be based on following equations:

$$\text{PCCCH\_GROUP}(0 \ldots KC-1) = ((\text{TMSI mod } 1000) \text{mod}(KC \times N)) \text{div } N \quad (13)$$

$$\text{PAGING\_GROUP}(0 \ldots M-1) = (((\text{TMSI mod } 1000) \text{div}(KC \times N)) \times N + (\text{TMSI mod } 1000) \text{mod } N + \text{Max}((m \times M) \text{div}(\text{SPLIT\_PG\_CYCLE}, m)) \text{mod } M \quad (14)$$

for m=0, Min(M, SPLIT_PG_CYCLE)−1

Likewise, for WCDMA and TDSCDMA, paging occasion can be computed using following equation:

Paging Occasion={(TMSI div $K$)mod(DRX cycle length div PBP)}×PBP+$n$×DRX cycle length+FrameOffset It will be appreciated that the corresponding considerations may be derived for CDMA2000. As IMSI and TMSI have different values, therefore mod 1000 of IMSI would have a different value than mod 1000 of TMSI in the above equations and accordingly, there will be different values for paging group and CCCH group.

In one example, once the PMP computation is made in accordance with the first PMP recomputation message, the PMP recomputation module 245 is configured determine whether the switching criterion is satisfied. If it is determined that the switching criteria is satisfied, the PMP recomputation module 245 sends a second PMP recomputation message. The second recomputation message indicates the network controller to switch back to normal PMP computation procedure. In an example, the second PMP recomputation message is sent on a location update message to the MSC requesting to switch back to the normal PMP computation procedure, which is to compute position of a paging message based on IMSI of the PMP recomputation SIM.

Likewise, in order to send the second PMP recomputation request, the PMP recomputation module 245 may use the spare bit in the location update message. For example, in the second PMP recomputation request, when the spare bit has value "1" it may indicate that the PMP computation has to be changed from TMSI-based computation back to the normal computation based on IMSI, while the spare bit value "0" may indicate it to be the usual location update request, sent for normal location update or periodic location update or IMSI-attach.

Although the description of the PMP recomputation procedure has been described in combination with the forced cell reselection method; however it will be understood that the PMP recomputation procedure may be implemented independent of the forced cell reselection method.

Figure 3:
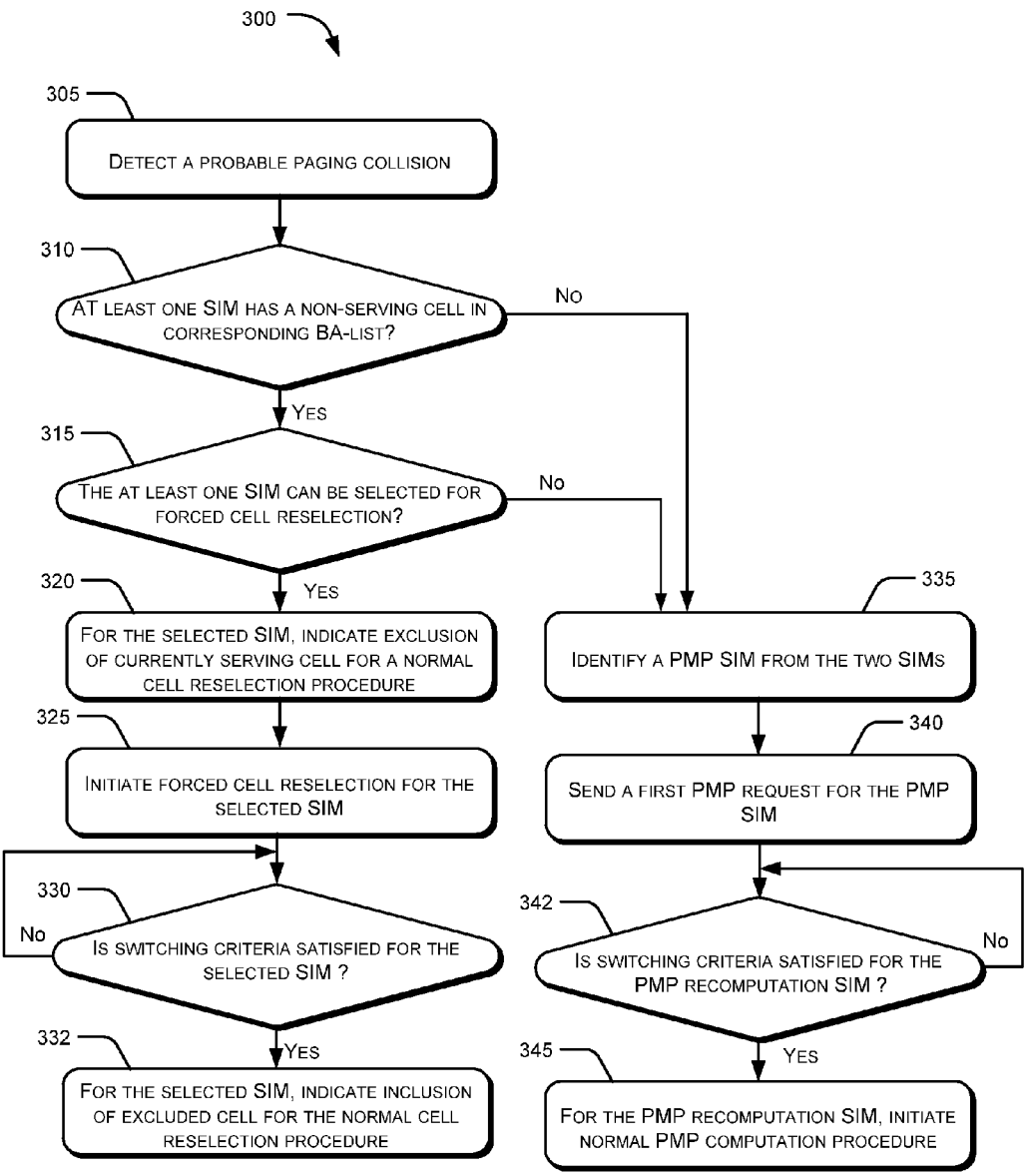
FIG. 3 illustrates a method for resolving paging collisions-to enable whole paging reception in a multi-SIM wireless communication device, according to an embodiment of the present subject matter.

FIG. 3 illustrates an exemplary method 300 for evading a paging collision in a communication device, such as the communication device 105-1, in accordance with an embodiment of the present subject matter. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as a magnetic disks and magnetic tapes, hard drives, or optically readable digital data storage media.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 305, a probable paging collision between two SIMs, such as, a first SIM 115-1 and a second SIM 115-2, of the communication device 105-1 is detected. The paging collision may include complete overlap or a partial overlap of paging messages for the two SIMs. In one implementation, the paging collision detection module 240 detects the probable paging collision. At block 310 it is determined whether at least one of the two SIMs has a non-serving cell in corresponding BA-list. In an implementation, the forced cell reselection module 135 determines whether either of the two SIMs 115 has a non-serving cell in corresponding BA-list. In one example, the determination may be based on a SIM priority, i.e., the check for availability of the non-serving cell is first made for a lowest priority SIM and if identified, block 310 proceeds to block 315, else a check may be performed for a next low priority SIM. In another example multiple SIMs may be determined to have a non-serving cell in their BA-list. If at least one of the SIMs 115 is determined to have a non-serving cell in the BA-list ('Yes' branch of the block 310), block 310 branches to block 315.

At block 315, it is determined whether the at least one of the SIMs can be selected for a forced cell reselection, based on one or more selection parameters. The selection parameters can be, for example, SIM priority and cell signal strength. Further, the cell selection parameters may be chosen such that either only one SIM is identified for forced-cell-reselection or none of the SIMs is identified for the same. In one example, the forced cell reselection module 135 is configured to identify the SIM for the forced cell reselection based on one or more selection parameters. If at block 315, a SIM is selected for the forced cell reselection, the method 300 proceeds to block 320.

At block 320, exclusion of a currently serving cell for the selected SIM for a normal cell reselection procedure is indicated. In one implementation, the forced cell reselection module 135 marks the currently serving cell for the selected SIM as "excluded" in the BA-list. The exclusion of the currently serving cell prevents the selected SIM from switching back to this serving cell when a normal cell reselection is performed.

At block 325, the forced cell reselection for the SIM selected at block 315, is initiated. Consequently, a non-serving cell present in the BA-list of the selected SIM is selected as new serving cell. Owing to switching of the serving cells, certain cell parameters are altered and the timing offset difference between these cell varies, which provides for a change in the position of a paging message for the SIM which had undergone the forced cell reselection, thereby resolving the paging conflict.

At block 330, it is determined if a switching criteria is satisfied for the selected SIM. The switching criterion includes, for example, change in paging parameters or normal cell reselection for either of the two SIMs. If at block 330, it is determined that the switching criteria is not satisfied (branch "No" of block 330), block branches back to the beginning of block 330 itself, where the selected SIM is forced to remain camped on to the cell identified at block 325. However, if at block 330 it is determined that the switching criteria is satisfied (branch "Yes" of block 330), block 330 branches to block 332.

At block 332, inclusion of the excluded cell for the normal cell reselection for the SIM which has undergone the forced cell reselection is indicated. In one example, in case the switching criterion is satisfied, the excluded cell may unmarked as "excluded" in the BA list and thereafter may be considered by the SIM in its normal cell reselection procedure.

Referring back to block 310, if at the block 310 it is determined that none of the two SIMs have a non-serving cell in their corresponding BA-list ('No' branch of block 310), block 310 branches to block 335. Further, if at block 315 it is determined that the at least one SIM cannot be selected for the forced cell reselection based on the selection parameters ('No' branch of block 315), block 315 also branches to block 335. In other words if it is determined that neither of the SIMs meet the selection criteria defined at block 315, at block 335, a paging message position (PMP) recomputation SIM from the two SIMs is identified based on one or more selection parameters. In one implementation, the PMP recomputation module 245 identifies the PMP recomputation SIM.

At block 340, a first PMP recomputation message is sent for the PMP recomputation SIM. The PMP recomputation message is sent to indicate to a network controller, currently serving the PMP recomputation SIM, to recompute the position of a corresponding paging message. In one example, the first PMP recomputation message prompts the network controller to compute PMP based on the TMSI of the PMP recomputation SIM instead of the IMSI. The change in computation of PMP provides for a change in the position of the paging message for the PMP recomputation SIM, thereby resolving the paging collision.

At block 342, it is determined whether the switching criteria is satisfied for the PMP recomputation SIM. The switching criterion includes, for example, change in paging parameters or normal cell reselection for either of the two SIMs. In case it is determined that the switching criteria is not satisfied ("No" branch of block 342), block 342 proceeds back to the beginning of block 342 itself, where the PMP computation based on TMSI is continued. However, if at block 342, it is determined that the switching criteria is satisfied, block 342 proceeds to block 345.

At block 345, normal PMP computation procedure is initiated for the PMP recomputation SIM. In case the switching criterion is satisfied, a second PMP recomputation message is sent to indicate to the network controller to switch back to the usual PMP computation process, which is based on IMSI of the PMP SIM.

Although embodiments for enabling whole paging reception by resolving paging collision have been described in language specific to structural features and/or methods, it is to be understood that the invention is not necessarily limited to the specific features or methods described. Rather, the specific features and methods are disclosed as exemplary embodiments for resolving the paging collision.

The invention claimed is:

1. A method to resolve paging collisions in a communication device comprising:
   detecting whether a paging collision between at least two subscriber identity modules (SIMs) in the communication device is probable;
   determining whether at least one SIM of the communication device has a non-serving cell associated with a corresponding broadcast control channel allocation list;
   ascertaining, based on one or more selection parameters, whether the at least one SIM can be selected for forced-cell reselection; and
   in response to detecting that the paging collision is probable;
   determining that the at least one SIM has the non-serving cell;
   ascertaining that the at least one SIM can be selected for the forced cell reselection;
   indicating exclusion of a currently serving cell of a SIM selected for the forced cell reselection from a normal cell reselection procedure; and
   initiating the forced cell reselection for the selected SIM to the non-serving cell.

2. The method as claimed in claim 1, wherein the selection parameters comprise SIM priority and cell signal strength.

3. The method as claimed in claim 1, further comprising:
   determining whether a switching criterion is satisfied for the selected SIM; and
   indicating inclusion of the excluded cell into a BA list corresponding to the selected SIM for the normal cell reselection process, when the switching criterion is satisfied.

4. The method as claimed in claim 3, wherein the switching criterion comprises at least one of a reconfiguration of one or more paging parameters for at least one of the SIMs and an occurrence of normal cell reselection for at least one of the SIMs.

5. The method as claimed in claim 1, further comprising:
   identifying a paging message position recomputation SIM, when at least one selection criterion is not satisfied, wherein the PMP recomputation SIM is identified based on the one or more selection parameters; and sending a PMP recomputation message for the PMP recomputation SIM, wherein the PMP recomputation message indicates a network controller to compute position of a paging message for the PMP recomputation SIM based on a Temporary Mobile Subscriber Identity number of the PMP recomputation SIM.

6. The method as claimed in claim 5, further comprising:
determining whether a switching criterion is satisfied for the PMP recomputation SIM; and
initiating a normal PMP computation process for the PMP recomputation SIM, when the switching criterion is satisfied, wherein the normal PMP computation process is based on an International Mobile Subscriber Identity number associated with the PMP recomputation SIM.

7. The method as claimed in claim 1, wherein the probable paging collision includes one of a complete overlap and a partial overlap.

8. A computer program product stored in a non-transitory computer readable medium for resolving paging collisions in a communication device, the computer program product comprising software instructions which, when run on the communication device, causes the communication device to:
detect whether a paging collision between at least two subscriber identity modules (SIMs) in the communication device is probable;
determine whether at least one SIM of the communication device has a non-serving cell associated with a corresponding broadcast control channel allocation list;
ascertain, based on one or more selection parameters, whether the at least one SIM can be selected for forced-cell reselection; and
in response to detecting that the paging collision is probable;
determine that the at least one SIM has the non-serving cell;
ascertain that the at least one SIM can be selected for the forced cell reselection;
indicate exclusion of a currently serving cell of a SIM selected for the forced cell reselection from a normal cell reselection procedure; and
initiate a forced cell reselection for the selected SIM to the non-serving cell.

9. A communication device, adapted to be associated with at least two SIMs, the communication device comprising:
a processor; and
a memory coupled to the processor, the memory comprising:
a paging collision detection module configured to:
detect whether a paging collision between at least two subscriber identity modules (SIMs) in the communication device is probable; and
a forced cell reselection module configured to:
determine whether at least one SIM from the at least two SIMs has a non-serving cell in a corresponding broadcast control channel allocation list;
ascertain whether the at least one SIM can be selected for forced cell reselection based on one or more selection parameters; and
in response to detecting that the paging collision is probable;
determine that the at least one SIM has the non-serving cell;
ascertain that the at least one SIM can be selected for the forced cell reselection;
indicate exclusion of a currently serving cell of a SIM selected for the forced cell reselection from a normal cell reselection procedure; and
initiate the forced cell reselection for the selected SIM to the non-serving cell.

10. The communication device as claimed in claim 9, wherein the forced cell reselection module is further configured to:
determine whether a switching criterion is satisfied for the selected SIM; and
indicate inclusion of the excluded cell for the normal cell reselection procedure for the selected SIM, when the switching criterion is satisfied.

11. The communication device as claimed in claim 9, further comprising a PMP recomputation module configured to:
identify a PMP recomputation SIM, when at least one selection criterion is not satisfied, wherein the PMP recomputation SIM is identified based on the one or more selection parameters; and
send a first PMP recomputation message for the PMP recomputation SIM, wherein the first PMP recomputation message indicates a network controller to compute position of a paging message for the PMP recomputation SIM based on Temporary Mobile Subscriber Identity number of the PMP recomputation SIM.

12. The communication device as claimed in claim 11, wherein the PMP recomputation module is further configured to:
determine whether a switching criterion is satisfied for the PMP recomputation SIM; and
send a second PMP recomputation message to initiate a paging message computation process based on IMSI number associated with the PMP recomputation SIM, when the switching criterion is satisfied.

13. The communication device as claimed in claim 12, wherein the first PMP recomputation message and the second PMP recomputation message are sent in a location update message.

* * * * *